US005827989A

United States Patent [19]

Fay et al.

[11] Patent Number: 5,827,989

[45] Date of Patent: Oct. 27, 1998

[54] SYSTEM AND METHOD FOR REPRESENTING A MUSICAL EVENT AND FOR CONVERTING THE MUSICAL EVENT INTO A SERIES OF DISCRETE EVENTS

[75] Inventors: Todor C. Fay, Bellevue; Mark Taylor Burton, Redmond, both of Wash.

[73] Assignee: Microsoft Corporation, Redmond, Wash.

[21] Appl. No.: 880,922

[22] Filed: Jun. 23, 1997

[51] Int. Cl.[6] .............................. G09B 15/02; G10H 7/00

[52] U.S. Cl. ............................................ 84/645; 84/477 R

[58] Field of Search ................................. 84/645, 464 R, 84/464 A, 477 R, 478; 345/302

[56] References Cited

U.S. PATENT DOCUMENTS

| | | | |
|---|---|---|---|
| 5,557,424 | 9/1996 | Panizza | 84/464 R X |
| 5,640,590 | 6/1997 | Luther | 345/302 |

*Primary Examiner*—Stanley J. Witkowski
*Attorney, Agent, or Firm*—Jones & Askew

[57] ABSTRACT

The present invention includes a system and a method for a series of discrete MIDI events to be represented by a single curve event. The curve event is stored as a curve data structure and may include one or more sub-curve data structures. Each sub-curve data structure represents one or more of the series of discrete MIDI events. The curve data structure identifies when the curve event should start, the type of MIDI events that the curve represents, and a list of one or more sub-curve data structures. Each of the sub-curve data structures identify a curve-shape, the start time for the playback of the sub-curve, the end time for the playback of the sub-curve, the minimum and maximum values that the sub-curve reaches, and an orientation of the sub-curve. At performance time, each sub-curve event in the curve data structure is converted into time-stamped, discrete MIDI events that can be provided as input to a MIDI device. This is accomplished by, for each sub-curve identified in a curve structure: (1) establishing the starting point of sub-curve; (2) establishing the value for the first MIDI event; (3) establishing the ending time of the sub-curve; (4) establishing the value for the last event; (5) generating a series of MIDI events between the first and last MIDI events.

33 Claims, 8 Drawing Sheets

SYSTEM AND METHOD FOR REPRESENTING A MUSICAL EVENT AND FOR CONVERTING THE MUSICAL EVENT INTO A SERIES OF DISCRETE EVENTS

TECHNICAL FIELD

The present invention relates to computer-based musical devices and, more particularly, relates to a method for representing a musical event that allows for efficient storage and transmission of musical data, and a method for converting the representation of the musical event into a series of discrete events.

BACKGROUND OF THE INVENTION

Musical Instrument Data Interface ("MIDI") devices support a wide variety of real-time expression commands for representing various aspects of a musical signal. An individual MIDI event may be used to represent an instantaneous change in an aspect of the musical signal. In response to receiving a MIDI event, a musical device may be instructed to instantaneously change a parameter of a musical signal such as the pitch of a note or the volume.

A sequencer is a device used for editing musical data, such as MIDI events, and converting the musical data into a musical signal in real time. Traditional sequencers represent various events, such as pitch bend, volume changes, mod wheel movement, and expression, as a series of discrete MIDI events. The use of a series of individual MIDI events to represent various aspects of a musical signal has several disadvantages. One disadvantage is that the series of individual MIDI events are inefficient for storage. Similarly, when transmitting musical data, the use of a series of individual MIDI events results in utilizing an excessive amount of bandwidth space. Therefore, there is a need for a system and a method to represent a musical event in a memory and bandwidth efficient manner.

Another disadvantage is that the use of a series of MIDI events is not natural from a musical perspective. For example, if a composer wants the music to swell into a crescendo, the composer views this event as one continuous change in the music as opposed to a series of discrete events. To edit a series of MIDI events using a sequencer can be an involved and complicated task. For instance, if a composer decides to increase the span of a crescendo, additional MIDI events must be added and the magnitude of the volume aspect of a musical signal represented by each MIDI event may need to be modified. Therefore, there is a need for a system and a method to represent a musical event in a manner that is natural from a musical perspective. Furthermore, there is a need for a system and a method to represent a musical event in a manner that is easily modified.

Therefore, there may be seen a need in the art for a system and method to represent a change in a musical signal, wherein the representation of the change can be efficiently stored, transmitted and modified.

SUMMARY OF THE INVENTION

Generally stated, the present invention provides a method for representing musical activities, that currently require a large number of MIDI events, by using a single curve event. More specifically, musical events such as pitch bend, volume change, mod wheel, and expression are currently represented by a series of discrete MIDI events.

For instance, a pitch bend may be represented by a series of MIDI pitch change events that slightly increase the value of the pitch at each step. This technique has at least two disadvantages. First, depending on the length of the musical event and the sample rate of the system, a significant number of discrete MIDI events may be required to represent a particular musical event. This results in an inefficient use of memory resources when storing the musical data and inefficient bandwidth utilization when transmitting the musical data. Secondly, when editing musical data using a MIDI sequencer, the task of modifying or creating a musical event is cumbersome and tedious. The present invention provides a method to represent these musical events by using a single curve event when editing, storing or transmitting the musical data, and then converting the single curve event back into the series of discrete MIDI events when the musical data is being performed.

The discrete MIDI events describing an expression change or musical event are replaced by curve events. If the expression change can not be represented by a single curve selected from the set of curves, then multiple curves can be linked together to represent the expression change. Thus, the musical data representing a performance may contain several curve events.

One possible set of curves includes a sine wave, linear, exponential, logarithmic, and instantaneous or step curves. Experience has shown that this set of curves can be used to accurately represent most of the expression changes in a musical performance; however, additional curves can also be defined and used in the present invention if necessary. In addition, if a particular curve-shape appears quite often, a specific curve representing that shape can be defined.

The curve events are stored in the musical data as a curve structure. The curve structure identifies (1) a time-offset from the beginning of the track that indicates when the curve event should start, (2) the type of MIDI events (i.e., pitch bend, volume, etc.) that the curve represents, (3) the track number that the curve event is associated with, and (4) a list of one or more curves, selected from the set of curves, that represent the expression change. Each of these curves is represented in the musical data as a sub-curve structure. The sub-curve structure identifies (1) a curve-shape (i.e., sine wave, linear, etc.), (2) the time-offset from the start time of the curve structure that indicates the start time for the playback of the sub-curve, (3) a time-offset from the start time of the curve structure that indicates the end time for the playback of the sub-curve, (4) the minimum and maximum values that the sub-curve reaches, and (5) an orientation indicator. The minimum and maximum values are typically associated with either the start or end points of the curve (i.e., the curves are monotonic); however, more complex curves could also be used. In these cases additional information such as starting value and ending value of the curve may be required.

When the musical data containing the curve events is being performed, each sub-curve event in the curve structure is converted into time-stamped, discrete MIDI events that can be provided as input to a MIDI device. The steps required in this process are summarized below.

For each sub-curve identified in a curve structure:

(1) Establish the starting point of sub-curve. This step involves adding the time-offset identified in the curve structure to the time-offset identified in the sub-curve structure in order to determine a time-offset from the beginning of the track that the sub-curve should start. This time is then used as the time-stamp for the first MIDI event generated for the sub-curve.

(2) Establish the value for the first event. This step involves identifying the value for the first MIDI event generated for the sub-curve. The value is determined as a function of the curve-shape, the orientation, and either the minimum or maximum value of the sub-curve according to the following rules:

For the instantaneous or step curve:

if the curve-orientation indicates that the curve is either not flipped, or horizontally flipped but not vertically flipped, use the maximum value; and if the curve-orientation indicates that the curve is either horizontally or vertically flipped, but not both, use the minimum value.

For all other curves:

if the curve-orientation indicates that the curve is either not flipped, or both horizontally and vertically flipped, use the minimum value; and if the curve-orientation indicates that the curve is either vertically flipped or horizontally and vertically flipped, use the maximum value.

(3) Establish the ending time of the sub-curve. This step involves adding the time-offset identified in the sub-curve structure to the start-time of the sub-curve. This time is then used as the time-stamp for the last MIDI event generated for the sub-curve.

(4) Establish the ending value for the last event. The ending value is selected based on the starting value. For the instantaneous or step curve, the ending value is assigned in accordance with the following rules:

if the curve-orientation indicates that the curve is either not flipped, or horizontally flipped and vertically flipped, use the maximum value; and if the curve-orientation indicates that the curve is either horizontally or vertically flipped, but not both, use the minimum value.

For all other curves, if the starting value is the minimum for the curve, then the ending value is the maximum and vise-versa.

(5) Generate the series of MIDI events between the first and last MIDI events. For each MIDI event, a time-stamp and a value must be determined. In the present invention, this is accomplished by using look-up tables. Other embodiments such as floating point equations could also be used. Each curve-shape is represented in a look-up table as a series of discrete steps that traverse a range of values. In the exemplary embodiment, the look-up table includes 200 steps that range from the value 0 at the first entry to 100,000 at the 200th entry. (In the equation method, each of these values could be calculated as necessary at run time). The use of 200 steps translates to 1/100th of a semitone for each step in a full range pitch bend across a whole note. Other resolutions could also be chosen and the present invention is not limited to any specific number of steps or range of values. The total length of any curve is determined by subtracting the time-offset for the beginning of the sub-curve from the time-offset for the ending of the sub-curve. Based on the length of the curve and the 200 entries in the look-up table, the time-offset for each MIDI event can be determined by dividing the length by 200. In some cases, these time stamps may exist at a higher resolution than is supported in the MIDI protocol. Thus, some events may be discarded if they occur too close in time.

Next, a value for each MIDI event is determined from examining the look-up tables based on the orientation and an event-number. The event-number is an index that is incremented for each MIDI event that is generated. One MIDI event is generated for the curve at each of the 200 sample points. Again, some of these events may be discarded if the time resolution is too close. The following rules are used to identify a look-up value (normalized value) from the table as the event-number is indexed from 1 to 199:

if the curve-orientation indicates the curve is not flipped, the normalized value=Table[event-number];

if the curve-orientation indicates the curve is only vertically lipped, the normalized value=100,000—Table[event-number];

if the curve-orientation indicates the curve is only horizontally flipped, the normalized value=Table[200—event-number]; and if the curve-orientation indicates the curve is vertically and horizontally flipped, the normalized value=100,000—Table[200-event-number].

The normalized value is then converted or actualized to the MIDI value in accordance with the following equation, given that a scaling multiplier (SubMult) is equal to the difference between the maximum and minimum values provided with the sub-curve data structure.

Actualized value=((normalized value/max-range)*SubMult)+minimum value

The present invention also includes a method for converting a series of MIDI events into a single curve event that can be efficiently stored or transmitted. Generally, a series of MIDI events are used to define a change in the magnitude of a parameter of the signal of a track over a period of time. Each of the MIDI events has a time-stamp relative to the beginning of the track, which identifies when the MIDI event is to be played. The series of MIDI events can be converted into a curve event by defining several data fields that represent the curve event. An event-type field for the curve event is determined based on the type of MIDI events in the series of MIDI events. A time-offset data field is equated to the time-stamp of the first MIDI event in the series of MIDI events. Next, the series of MIDI events are divided into one or more sub-series of MIDI events. The division is determined by identifying sub-series of MIDI events that represent certain changes in the parameter of the signal. For instance, if the value of the parameter exponentially increases from point A to point B, then the MIDI events between point A and point B will form one sub-series. The MIDI events are divided into sub-series that contain the maximum number of consecutive MIDI events for which the contour of the change of the parameter of the signal over the time represented by the MIDI events can be represented by a predefined curve.

Once the MIDI events are divided into sub-series, additional fields are identified for each sub-series. A curve-shape field identifies the contour of the parameter represented by the sub-series. The curve-shape identifies a predefined curve, selected from the plurality of predefined curves, to represent the sub-series. A start-time data field identifies the start of the sub-series of MIDI events relative to the start of the track. An end-time data field identifies the end of the sub-series of MIDI events relative to the start of the track. A maximum value data field identifies the maximum value for the magnitude of the parameter of the signal represented in the sub-series of MIDI events. A minimum value data field identifies the minimum value for the magnitude of the parameter of the signal represented by the sub-series of MIDI events.

In operation, a musical device receives a series of original MIDI events from a source such as a memory device or a data interface. The musical device converts the original MIDI events into a single curve event. The musical device then either stores, transmits, or allows a user to edit the curve event. Finally, at playback time, MIDI events are recreated from the single curve event. If the curve event was only transmitted or stored, the recreated MIDI events will be approximate to but not necessarily identical to the original MIDI events. If the curve event was modified during an edit process, the MIDI events will represent the new curve event.

Thus, the present invention includes a system and a method for representing a musical event in a memory and bandwidth efficient manner. In addition, the present invention includes a system and a method to represent a musical event in a manner that is natural from a musical perspective and that can be easily modified. These and other aspects, features, and advantages of the present invention will be more clearly understood and appreciated from a review of the following detailed description of the present invention and possible embodiments thereof, and by reference to the appended drawings and claims.

DETAILED DESCRIPTION

Figure 1:
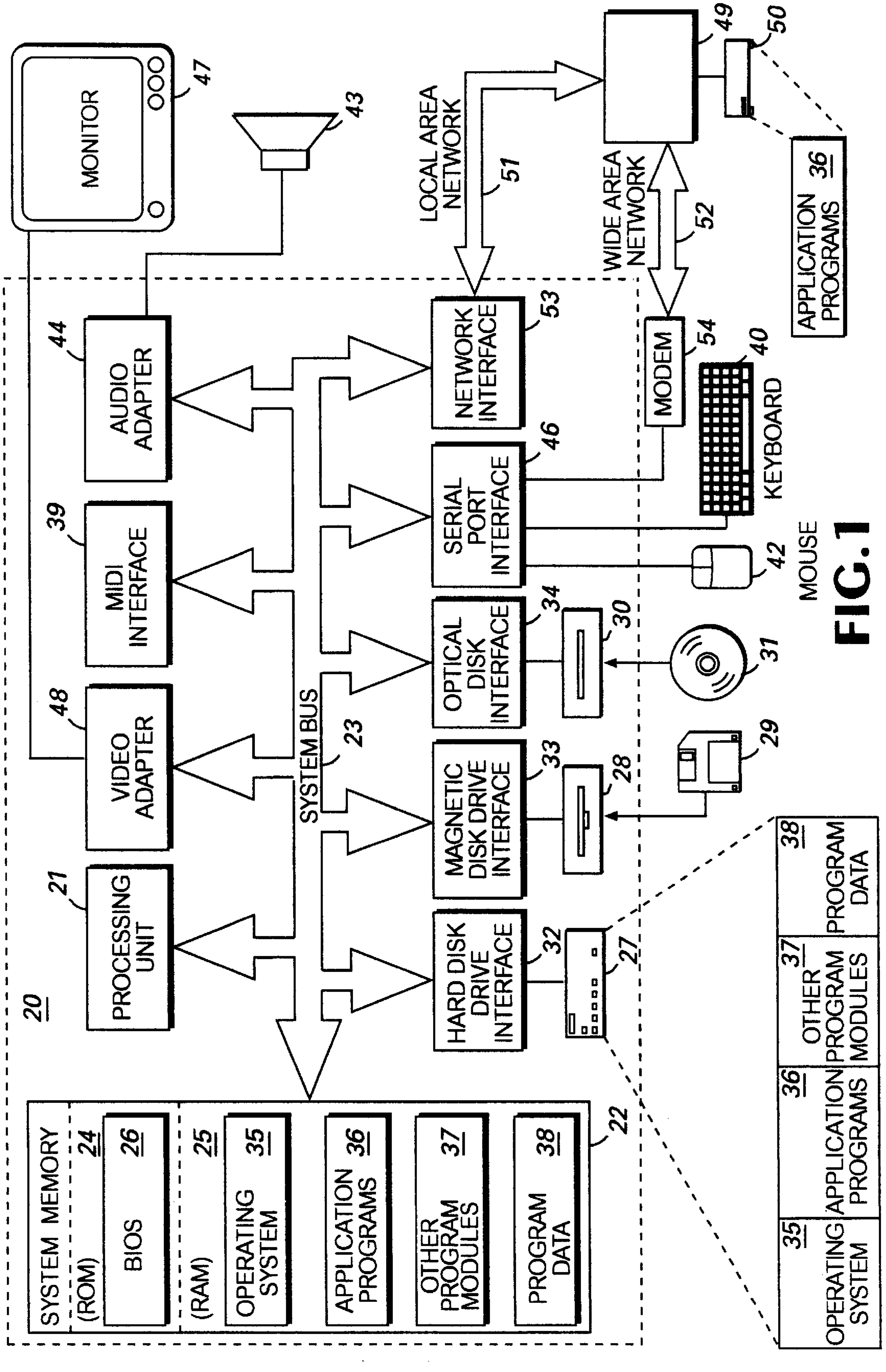
FIG. 1 is a system diagram that illustrates an exemplary environment suitable for implementing embodiments of the present invention.

The present invention is directed toward a method for representing a musical event that allows for efficient storage and transmission of musical data, and a method for converting the representation of the musical event into a series of discrete events.

One aspect of the present invention is to represent a musical event as a single event rather than a series of MIDI events. A musical event is defined as a change in a parameter of a musical signal over a period of time. The swelling of a note into a crescendo is an example of a musical event. This aspect of the present invention provides a data structure for representing a musical event as a series of one or more continuous curves. The series of curves define a contour that follows the changing magnitude of the parameter of the musical signal. The data structure is referred to as a curve event. A single curve event can be used to describe a musical event that previously would require several hundred MIDI events. Advantageously, the use of curve events reduces the amount of memory required to represent the musical event. Thus, the musical data can be more efficiently stored or transmitted. Furthermore, this aspect of the present invention provides a natural way for the musical event to be viewed and modified by a composer. Another aspect of the present invention is to provide a system and a method for converting the data structure into a series of MIDI events at playback time.

Referring now to the drawings, in which like numerals represent like elements through the several figures, these aspects of the present invention and the preferred operating environment will be described.

EXEMPLARY OPERATING ENVIRONMENT

FIG. 1 is a system diagram that illustrates an exemplary environment suitable for implementing embodiments of the present invention. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules or application programs as well as a combination of interacting hardware and software components.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or- programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary system illustrated in FIG. 1, includes a conventional personal computer 20, including a processing unit 21, system memory 22, and a system bus 23 that couples the system memory to the processing unit 21. The system memory 22 includes read only memory (ROM) 24 and random access memory (RAM) 25. The ROM 24 provides storage for a basic input/output system 26 (BIOS), containing the basic routines that help to transfer information between elements within the personal computer 20, such as during start-up. The personal computer 20 further includes a hard disk drive 27, a magnetic disk drive 28 for the purpose of reading from or writing to a removable disk 29, and an optical disk drive 30 for the purpose of reading a CD-ROM disk 31 or to read from or write to other optical media. The hard disk drive 27, magnetic disk drive 28, and optical disk drive 30 interface to the system bus 23 through a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives 27–30 and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, track ball, light pen, game pad, scanner, camera, or the like. These and other input devices are often connected to the processing unit 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. One or more speakers 43 are connected to the system bus via an interface, such as an audio adapter 44. In addition to the monitor and speakers, personal computers typically include other peripheral output devices (not shown), such as printers and plotters.

The personal computer 20 includes a musical instrumentation digital interface ("MIDI") adapter 39 that provides a means for the PU 21 to control a variety of MIDI compatible devices (i.e., electronic keyboards, synthesizers, etc.) as well as receive MIDI events from the same. The MIDI adapter operates by receiving data over the system bus 23, formatting the data in accordance with the MIDI protocol, and transmitting the data over a MIDI bus 45. The equipment attached to the MIDI bus will detect the transmission of the MIDI formatted data and determine if the data is to be accepted and processed or ignored.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. These types of networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

EXEMPLARY DATA STRUCTURE

Figure 2:
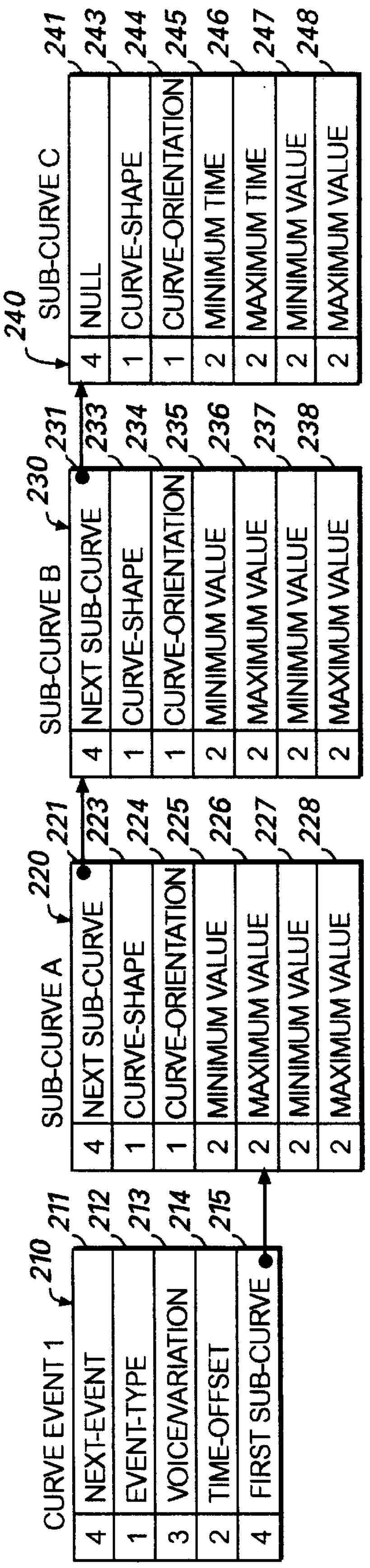
FIG. 2 is a block diagram that illustrates an exemplary data structure for storing a musical curve event.

FIG. 2 is a block diagram that illustrates an exemplary data structure for storing a musical curve event. Two types of data structures comprise a complete curve event, one parent curve structure 210 and one or more sub-curve structures (i.e., 220, 230, and 240).

The parent curve structure 210 includes 5 data fields labeled next-event 211; event-type 212; track 213; time-offset 214; and first sub-curve 215. The next-event data field 211 is a pointer to the MIDI event or curve event that occurs next in time. The event-type data field 212 identifies the type of MIDI events that are represented by the curve event (i.e., Pitch Bend, Volume, Mod Wheel, Expression). The track data field 213 is used to identify the track and/or channel that is associated with the curve event. The time-offset data field 214 is used to identify the point in time that the curve event should be converted and played back. In one embodiment, this value is an offset from the beginning of the track identified in the track data field 213. In another embodiment, this value can be an absolute time reference. The first sub-curve data field 215 is a pointer to the first sub-curve data structure of an ordered series of data structures. The ordered series of sub-curve data structures can include one or more sub-curve data structures. For the example illustrated in FIG. 2, the ordered list of sub-curve data structures includes three such data structures 220, 230, and 240.

Each sub-curve data structure represents a sub-set of the series of MIDI events represented by the curve event. In effect, each sub-curve data structure represents a time-slice of the curve event. The sub-curve data structures include 8 data fields. For the sub-curve A data structure 220, these data fields are labeled next sub-curve 221, curve-shape 223, curve-orientation 224, minimum time 225, maximum time 226, minimum value 227, and maximum value 228. The next sub-curve data field identifies the next sub-curve data structure in the ordered list of data structures. For example, the next sub-curve data field 221 identifies the sub-curve B 230 and the next sub-curve data field 231 identifies the sub-curve C 240. The sub-curve C data structure 240 is the last sub-curve data structure in the ordered list. Thus, the next sub-curve data field 241 of the sub-curve D data structure is set to a value that indicates the end of the ordered list. This can be accomplished by using a NULL pointer or some other similar means.

Figure 3:
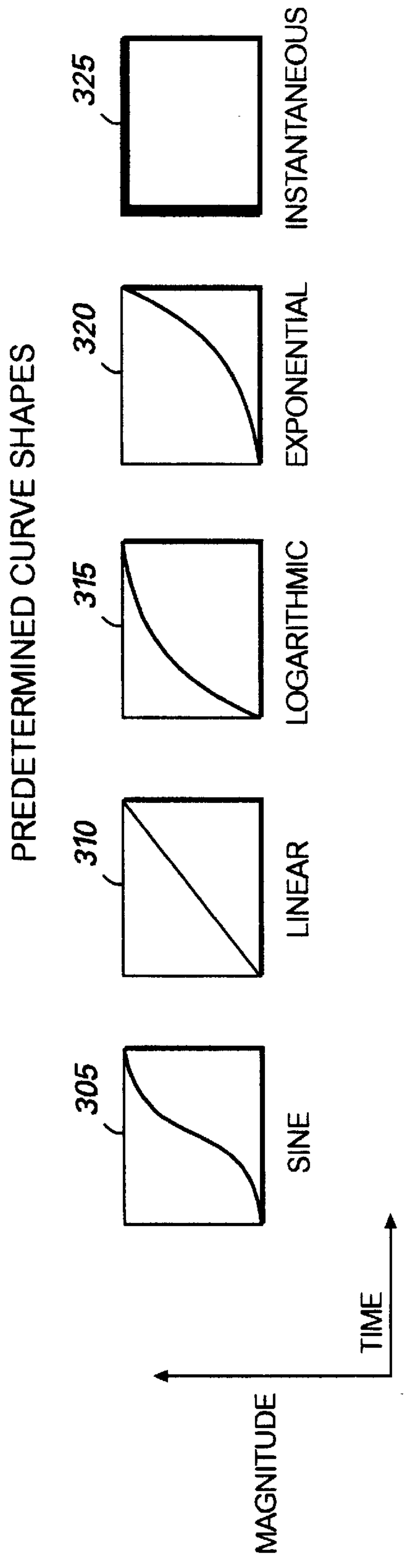
FIG. 3 is a diagram of several predefined curve-shapes that may be incorporated into various embodiments of the present invention.

The curve-shape data field (223, 233, 243) identifies one of several curve-shapes. Each shape represents the general characteristics in the change in magnitude of the parameter of the musical signal represented by the sub-curve data structure. FIG. 3 is a diagram of several predefined curve-shapes that may be incorporated into various embodiments of the present invention. These curve-shapes include a sine curve 305, a linear curve 310, a logarithmic curve 315, an exponential curve 320, and an instantaneous curve 325. Each curve-shape represents a unit of change in the magnitude of a parameter over a unit of time. The curve-shapes identified in FIG. 3 can be used to describe most expression curves in a performance, and thus, have been selected for the exemplary embodiment. However, the present invention is not limited to, nor required to use this set of curve-shapes. Although in most instances, one of the curve-shapes in FIG. 3 will be appropriate for representing at least a portion of the musical event, the present invention allows for any number of additional curve-shapes including splined curves.

The curve-orientation (224, 234, 244), minimum time (225, 235, 245), maximum time (226, 236, 246), minimum value (227, 237, 247), and maximum value (228, 238, 248) data fields are used to manipulate the curve-shape identified in the curve-shape data field. In an exemplary embodiment, the curve-orientation data field (224, 234, 244) can be set to one of the following orientations: not-flipped, horizontally flipped, vertically flipped, or horizontally and vertically flipped. The curve-orientation data field (224, 234, 244) identifies the actual orientation that the curve-shape must be placed in order to represent a portion of the musical event. If the orientation is horizontally flipped, then the curve-shape flipped along the horizontal axes similar to turning a page in a book. Likewise, if the orientation is vertically flipped, the curve-shape is flipped along the vertical access. In an alternative embodiment, the curve-orientation data field (224, 234, 244) could be represented by a value from 0 to 360 degrees representing an amount to radially rotate the curve-shape. In another embodiment, the curve-orientation data field (224, 234, 244) could simply indicate whether the curve-shape should be used as is or as a mirrored image. In yet another embodiment, the curve-orientation data field (224, 234, 244) could use a combination of two or more of the previously described techniques. In another embodiment, the curve-orientation data field (224, 234, 244) could be eliminated and additional curve definitions could be provided for each necessary orientation of the curve shape.

The minimum time data field (225, 235, 245) is used to identify the starting time for the sub-curve. Thus, the minimum time (224, 234, 244) could be an offset from the beginning of the track, an offset from the Time-offset 214 of the parent curve data structure, an offset from the previous sub-curve data structure, an absolute time, or some other similar means. The minimum time (225, 235, 245) and the maximum time (226, 236, 246) are used to define the length of the time-slice represented by the sub-curve. The difference between the maximum time (226, 236, 246) and the minimum time (225, 235, 245) is referred to as the time-span of the sub-curve data structure. If the time-span is shorter than the unit of time represented by the curve-shape, then the curve-shape will, in effect, be compressed in the time dimension when generating MIDI events. If the time-span is longer than the unit of time represented by the curve-shape, the curve-shape will, in effect, be expanded in the time dimension when generating MIDI events. An example of this effect will be described in conjunction with FIG. 4 below.

The difference between the maximum value data field (228, 238, 248) and the minimum value data field (227, 237, 247) is referred to as the magnitude-span of the sub-curve data structure. Over the time-span represented by a sub-curve data structure, the parameter will traverse the magnitude-span. If the magnitude-span is smaller than the unit of change represented by the predetermined curve-shape, the curve-shape will, in effect, be compressed in the magnitude dimension when generating MIDI events. If the magnitude-span is larger than the unit of change represented by the predetermined curve-shape, the curve-shape will, in effect, be expanded in the magnitude dimension when generating MIDI events.

In the exemplary embodiment, each of the predetermined curve-shapes monotonically increases with time from a starting point to an ending point. However, depending on the curve-orientation data field, the curve-shapes may be treated as monotonically decreasing with time.

Figure 4:
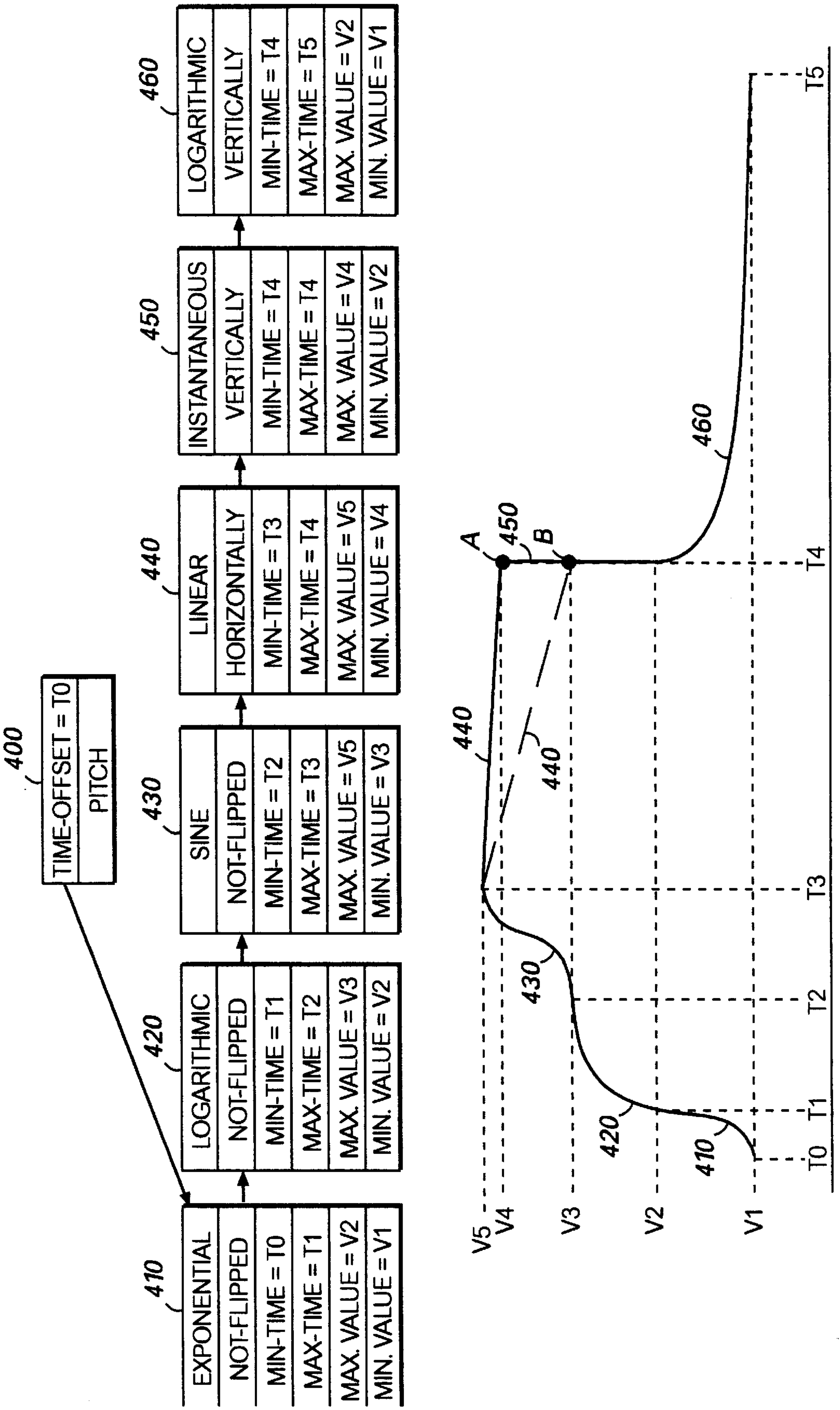
FIG. 4 is a diagram illustrating the fields of an exemplary data structure that defines a specific musical curve event.

FIG. 4 is a diagram illustrating the certain fields of an exemplary data structure and the contour of the represented magnitude of the parameter when MIDI events are generated from the curve event. In actuality, a series of discrete MIDI events will be generated rather than a continuous curve, however, for illustrative purposes, a continuous curve has been drawn. The parent curve data structure 400 indicates that the curve event begins at time T0 and that the curve event modifies the pitch of a musical signal. An ordered list of five sub-curve data structures (410, 420, 430, 440, and 450) is illustrated.

The first sub-curve data structure 410 identifies an exponential curve-shape with a curve-orientation of not-flipped. The minimum time and maximum time data fields indicate that the time-span of the sub-curve data structure 410 extends from T0 to T1. The time-span T1–T0 is smaller than the unit of time represented by the predetermined curve-shape, and thus, the illustrated curve indicates that the exponential curve is compressed in the time dimension. The maximum value and the minimum value indicate that the magnitude-span of the sub-curve data structure extends from V1 to V2.

The second sub-curve data structure 420 identifies a logarithmic curve-shape with a curve-orientation of not-flipped. The time-span for the second sub-curve extends from T1 to T2 and the magnitude-span extends from V2 to V3. The third sub-curve data structure 430 identifies a sine curve-shape with a not-flipped orientation. The time-span for the third sub-curve extends from T2 to T3 and the magnitude-span extends from V3 to V4. The second sub-curve 420 and the third sub-curve 430 illustrate time-slices that did not require compression or expansion in either the time or the magnitude dimensions.

The fourth sub-curve data structure 440 identifies a linear curve-shape that is horizontally flipped. The time-span for the fourth sub-curve 440 extends from T3 to T4 and the magnitude-span extends from V5 to V4. The time-span T4–T3 is larger than the unit of time represented by the predetermined curve-shape, and thus, the illustrated curve indicates that the linear curve is expanded in the time dimension. The magnitude-span V5–V4 is smaller than the unit of magnitude represented by the predetermined curve-shape, and thus, the illustrated curve indicates that the linear curve is compressed in the magnitude dimension.

The fifth sub-curve data structure 450 identifies an instantaneous curve-shape that is horizontally flipped. The minimum time and the maximum time for the fifth sub-curve 450 are the same, T4. Therefore, the time-span for the fifth sub-curve structure is zero and the instantaneous curve is compressed in the time dimension. The magnitude-span V4–V3 is larger than the unit of magnitude represented by the predetermined curve-shape, and thus, the illustrated curve indicates that the instantaneous curve is expanded in the magnitude dimension.

The sixth sub-curve data structure 460 identifies a logarithmic curve that is vertically flipped. The time-span for the sixth sub-curve 460 extends from T4 to T5 and the magnitude-span extends from V2 to V1. The time-span T5–T4 is larger than the unit of time represented by the predetermined curve-shape, and thus, the illustrated curve indicates that the logarithmic curve is expanded in the time dimension.

EFFICIENCY OF DATA STRUCTURE

Returning to FIG. 5, each field of the data structure includes a number in the left-hand column. This number represents the number of bytes or octets that the data structure requires to represent this field. curve event 1, the parent data structure 210, requires 14 bytes of memory. Each of the sub-curve data structures (220, 230, 240) required 18 bytes. Thus, for the curve event illustrated in FIG. 4, a total of 122 bytes are required. If the curve event illustrated in FIG. 4 were represented using discrete MIDI events, over 3000 bytes of memory would be required. This value is based on each MIDI event requiring 3 bytes of memory and each of the sub-curves, with the exception of sub-curve 450, represents 200 MIDI events. Sub-curve 450 represents only 1 MIDI event.

CONVERSION OF DATA STRUCTURE

As previously mentioned, advantages of the exemplary data structure include efficient use of memory when storing the curve event and efficient use of bandwidth when transmitting musical data. At playback time, the curve event must be converted into commands or an appropriate syntax for directly controlling the musical hardware. In an exemplary embodiment, the curve events are converted into MIDI events.

Figure 5:
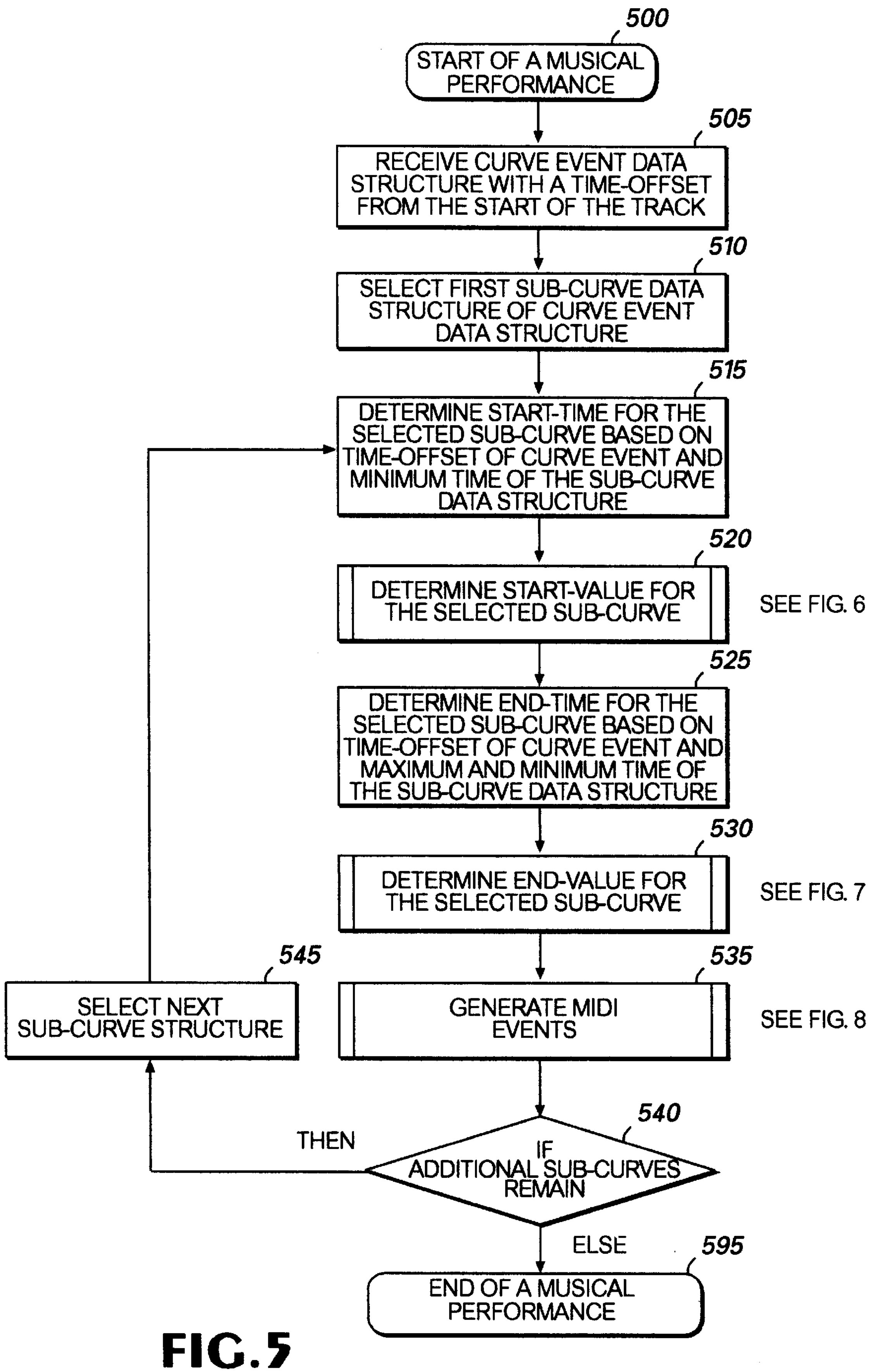
FIG. 5 is a flow diagram illustrating the process of an exemplary embodiment in converting a curve event data structure into a series of MIDI events.

FIG. 5 is a flow diagram illustrating the process of an exemplary embodiment in converting a curve event data structure into a series of MIDI events. The process begins at the start of a musical performance 500 of musical data. The musical data could be pre-recorded data that is retrieved from a storage media or real-time generated data received from a musical device such as a keyboard or a sequencer. During the musical performance, a converting means receives the musical data and, if necessary, converts it into MIDI events for controlling a MIDI device. At step 505, a curve event data structure is received by the converting means. The curve event data structure includes a parent curve data structure and one or more sub-curve data structures. The parent curve data structure identifies a musical track associated with the curve event. In addition, the parent curve data structure identifies a time-offset from the start of the track.

At step 510, the first sub-curve data structure of the curve event is selected for processing. The sub-curve data structure, as illustrated in FIG. 2, includes a curve-shape, a curve-orientation, a minimum and maximum time, and a minimum and maximum value. The processing includes identifying the start-time, end-time, start-value and end-value for the time-slice of a musical performance represented by the sub-curve structure. In addition, the processing includes generating a series of MIDI events to perform the time-slice of the musical performance.

At step 515 the converting means determines the start-time for the selected sub-curve based on the time-offset of the parent curve data structure and the minimum time of the sub-curve data structure. The start-time identifies the point in time, relative to the start of the track, that the sub-curve data structure is applicable.

Figure 6:
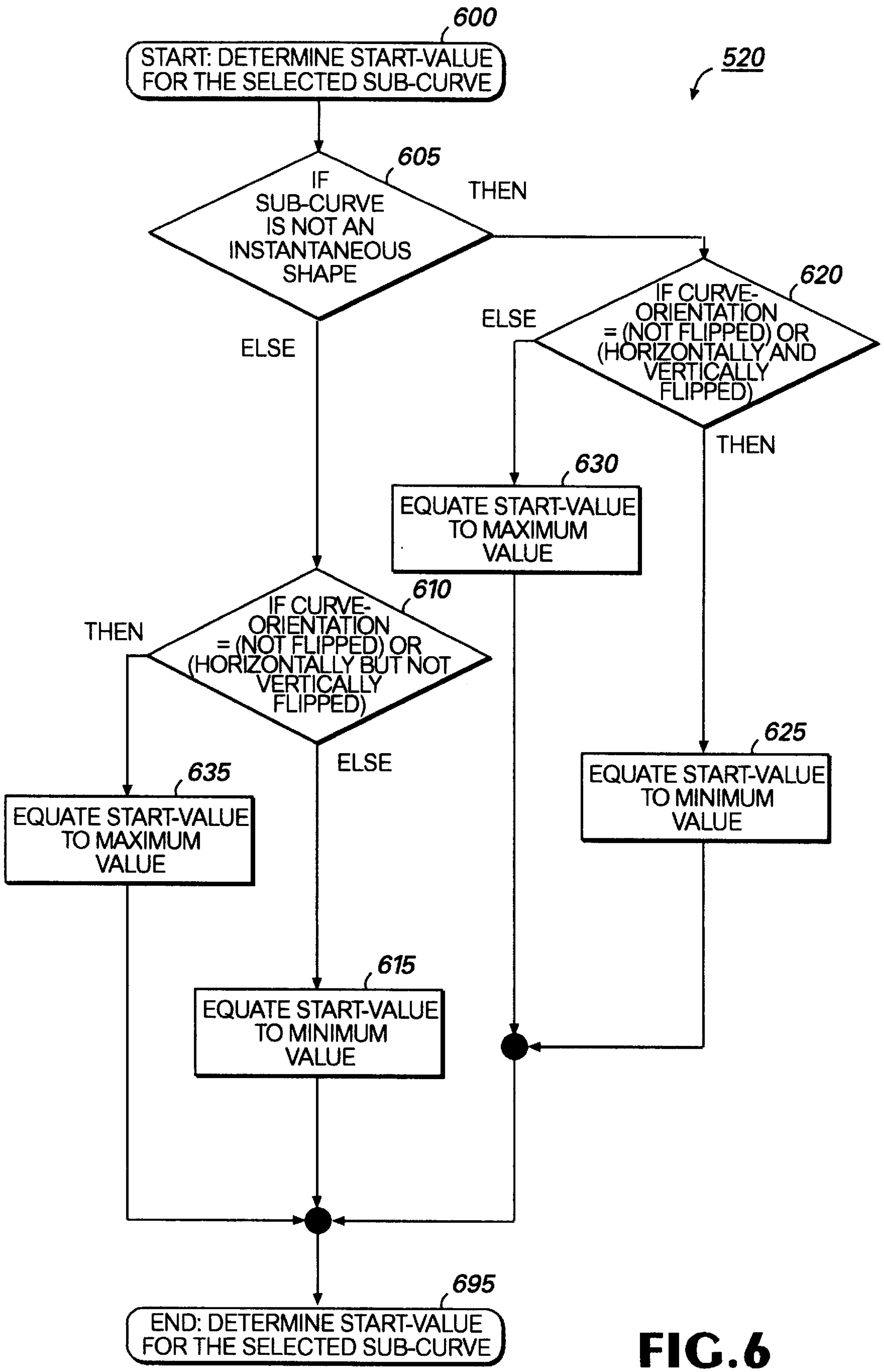
FIG. 6 is a flow diagram illustrating an exemplary process for determining the start-value for a selected sub-curve.

At step 520, the start-value for the selected sub-curve is determined. FIG. 6 is a flow diagram illustrating an exemplary process for determining the start-value for a selected sub-curve. The process begins at step 600. At step 605, the curve-shape data field of the sub-curve data structure is examined. If the curve-shape is an instantaneous curve-shape (e.g., 325 in FIG. 3), processing continues at step 610. If the curve-shape data field identifies any other type of curve-shape, processing continues at step 620.

At step 610, the curve-orientation data field of the selected sub-curve data structure is examined. If the curve-orientation indicates that the instantaneous curve-shape is either: (1) not-flipped; or (2) horizontally flipped but not vertically flipped, processing continues at step 635 where the start-value is equated to the maximum value data field of the sub-curve data structure. If the curve-orientation indicates any other status, processing continues at step 615 where the start-value is equated to the minimum value data field.

At step 620, the curve-orientation data field of the selected sub-curve data structure is examined. If the curve-orientation indicates that the non-instantaneous curve-shape is either: (1) not-flipped; or (2) vertically flipped and horizontally flipped, processing continues at step 625 where the start-value is equated to the minimum value data field. If the curve-orientation indicates any other status, processing continues at step 630 where the start-value is equated to the maximum value data field.

The process of determining the start-value ends at step 695 after the start-value has been equated to either the maximum or minimum value data fields. Processing continues at step 525 of FIG. 5.

At step 525, the converting means determines the end-time for the selected sub-curve based on the time-offset of the parent curve data structure, and the minimum time and the maximum time of the sub-curve data structure. The end-time identifies the point in time, relative to the start of the track, that the sub-curve data structure is no longer applicable. Processing then continues at step 530.

Figure 7:
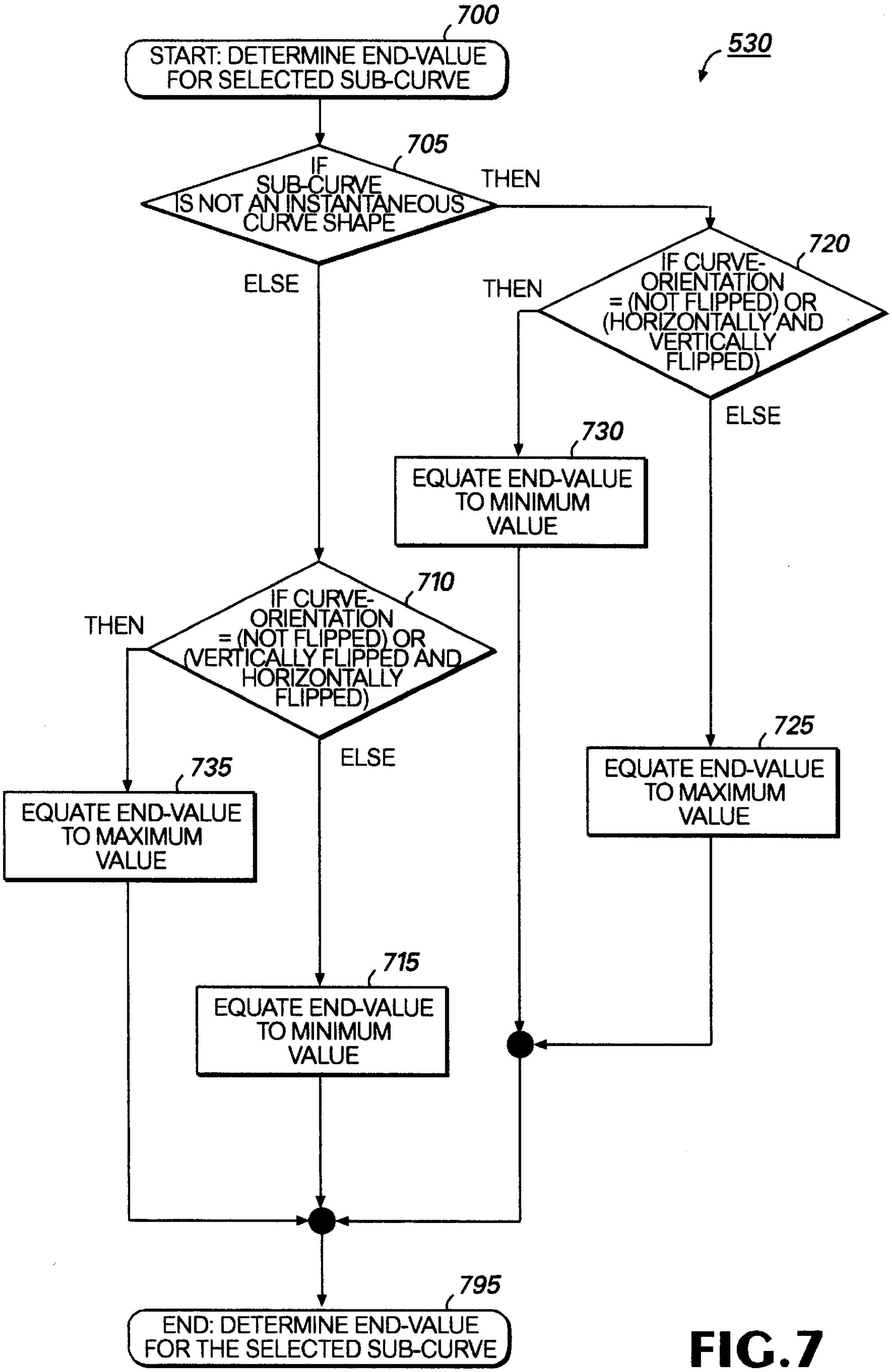
FIG. 7 is a flow diagram illustrating an exemplary process for determining the end-value for a selected sub-curve.

At step 530, the end-value for the selected sub-curve is determined. FIG. 7 is a flow diagram illustrating an exemplary process for determining the end-value for a selected sub-curve. The process begins at step 700. At step 705, the curve-shape data field of the sub-curve data structure is examined. If the curve-shape is an instantaneous curve-shape (e.g., 325 in FIG. 3), processing continues at step 710. If the curve-shape data field identifies any other type of curve-shape, processing continues at step 720.

At step 710, the curve-orientation data field of the selected sub-curve data structure is examined. If the curve-orientation indicates that the instantaneous curve-shape is either: (1) not-flipped; or (2) vertically flipped and horizontally flipped, processing continues at step 735 where the end-value is equated to the maximum value data field. If the curve-orientation indicates any other status, processing continues at step 715 where the end-value is equated to the minimum value data field.

At step 720, the curve-orientation data field of the selected sub-curve data structure is examined. If the curve-orientation indicates that the non-instantaneous curve-shape is either: (1) not-flipped; or (2) vertically flipped and horizontally flipped, processing continues at step 725 where the end-value is equated to the maximum value data field. If the curve-orientation indicates any other status, processing continues at step 730 where the end-value is equated to the minimum value data field.

The process of determining the end-value ends at step 795 after the end-value has been equated to either the maximum or minimum value data fields. Processing continues at step 535 of FIG. 5.

At step 535, the converting means generates MIDI events for the selected sub-curve of the curve event. The details of this process will be described in conjunction with FIGS. 8 and 9 below. After generating the MIDI events for a selected sub-curve data structure, processing continues at step 540. If additional sub-curves remain, processing continues at step 545 where the next sub-curve data structure is selected and the process returns again to step 515. If no additional sub-curves remain, the musical performance is continued at step 595. At this point, receiving another curve event data structure will result in returning to step 505.

GENERATING MIDI EVENTS

Figure 8:
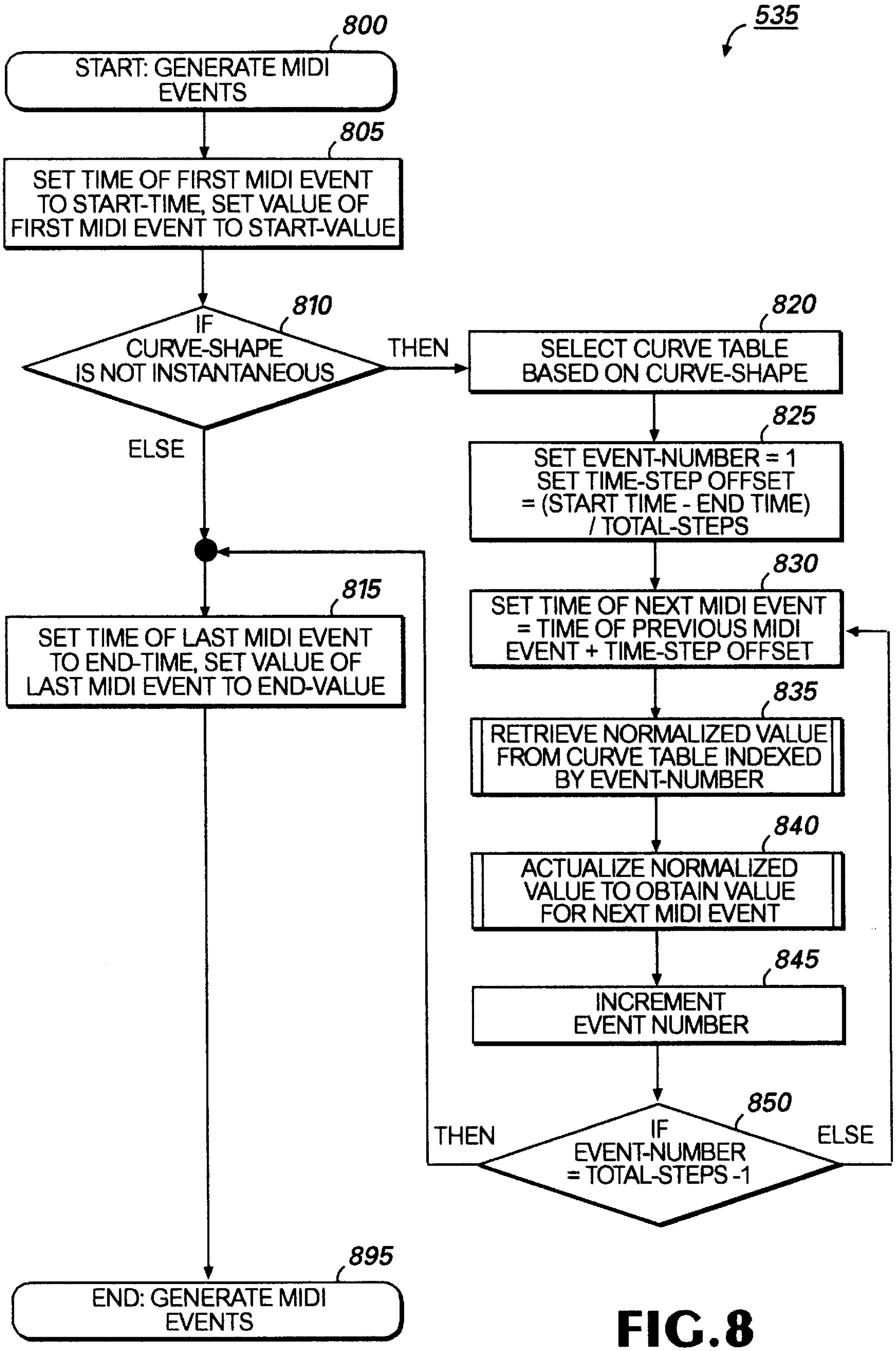
FIG. 8 is a flow diagram illustrating an exemplary process for generating a series of MIDI events for a selected sub-curve, step 535 of FIG. 5.

FIG. 8 is a flow diagram illustrating an exemplary process for generating a series of MIDI events for a selected sub-curve (i.e., step 535 of FIG. 5). The process begins at step 800. At step 805, the first MIDI event in the series of MIDI events is created. The time-stamp for the first MIDI event is set to the start-time for the curve-shape determined in step 515 of FIG. 5. The start-value of the first MIDI event is set to the start-value of the curve-shape as determined in step 520 of FIG. 5.

At step 810 the curve-shape data field of the selected sub-curve data structure is examined. If the curve-shape is an instantaneous curve-shape, processing continues at step 815. If the curve-shape is anything other than an instantaneous curve-shape, processing continues at step 820.

At step 815, the last MIDI event in the series of MIDI events is created. The time stamp for the last MIDI event is set to the end-time determined in step 525 of FIG. 5. The end-value of the last MIDI event is set to the end-value of the curve-shape as determined in step 530 of FIG. 5. Thus, if the curve-shape is instantaneous, then only two MIDI events need to be generated.

At step 820, processing continues for sub-curves having a non-instantaneous curve-shapes. In an exemplary embodiment, a curve look-up table representing a curve is selected based on the curve-shape. Alternative embodiments may represent a curve using other methods such as an equation, a function call, or some other similar means. The curve look-up table contains values for a specific curve-shape. The curve look-up tables can be pre-generated and then read at playback time or they can be generated at playback time. The values in the curve look-up table are normalized to integers ranging from zero to 100,000. Each curve look-up table is broken down into a specific number of steps ("total-steps"). Although a wide range of values for total-steps could be used, the exemplary embodiment uses 200 total-steps. For a pitch bend curve where the sensitivity is the most important, the use of 200 total-steps translates to 1/100th of a semitone for each increment in a full range pitch bend across a whole note. This is perceptually insignificant.

The first step of each curve look-up table contains the value zero. The last step of each curve look-up table contains the value 100,000. The other steps within the curve look-up table match the values obtained by computing the table curve function, from the minimum to the maximum value, normalized so the minimum value is zero and the maximum value is 100,000 rounded to the nearest integer. Table 1 provides the functions required to calculate the steps in the curve look-up table for the curve-shapes identified in FIG. 2.

TABLE 1

| Curve shape | Function (where n ranges from 0 to 200) |
|---|---|
| Sine | SineTable[n] = sin(n*9/10–90)*100,000 |
| Linear | LinearTable[n] = n*500 |
| Exponential | ExpTable[n] = $(11^{(n/200)} - 1)$*10,000 |
| Logarithmic | LogTable[n] = log10(1 + (n*9/200))*100,000 |
| Instant | No Table necessary |

At step 825, of two variables are initialized. An event-number variable is initialized to one (1). The event-number variable is used to count the number of MIDI events that have been generated for a sub-curve data structure. In the exemplary embodiment, the maximum number of MIDI events for each sub-curve is equal to the number of total-steps in the curve look-up table. However, in other embodiments, the maximum number of MIDI events may exceed the number of steps in the curve look-up table. At step 825, a time-step offset variable is initialized to the time-span of the sub-curve data structure divided by the total-steps. Thus, the time-step offset is equated to the difference between the start-time and the end-time of the curve-shape divided by the total-steps. After the initialization is completed, processing continues at step 830.

At step 830, the time-stamp for the next MIDI event is determined. Each MIDI event in the series of MIDI events, exclusive of the first and last MIDI event, is set to the value of the previous MIDI event incremented by the time-step offset. Thus, the first time step 830 is performed, the time stamp of the second MIDI event is set to the time-stamp of the first MIDI event incremented by the time-step offset. Processing then continues at step 835.

Figure 9:
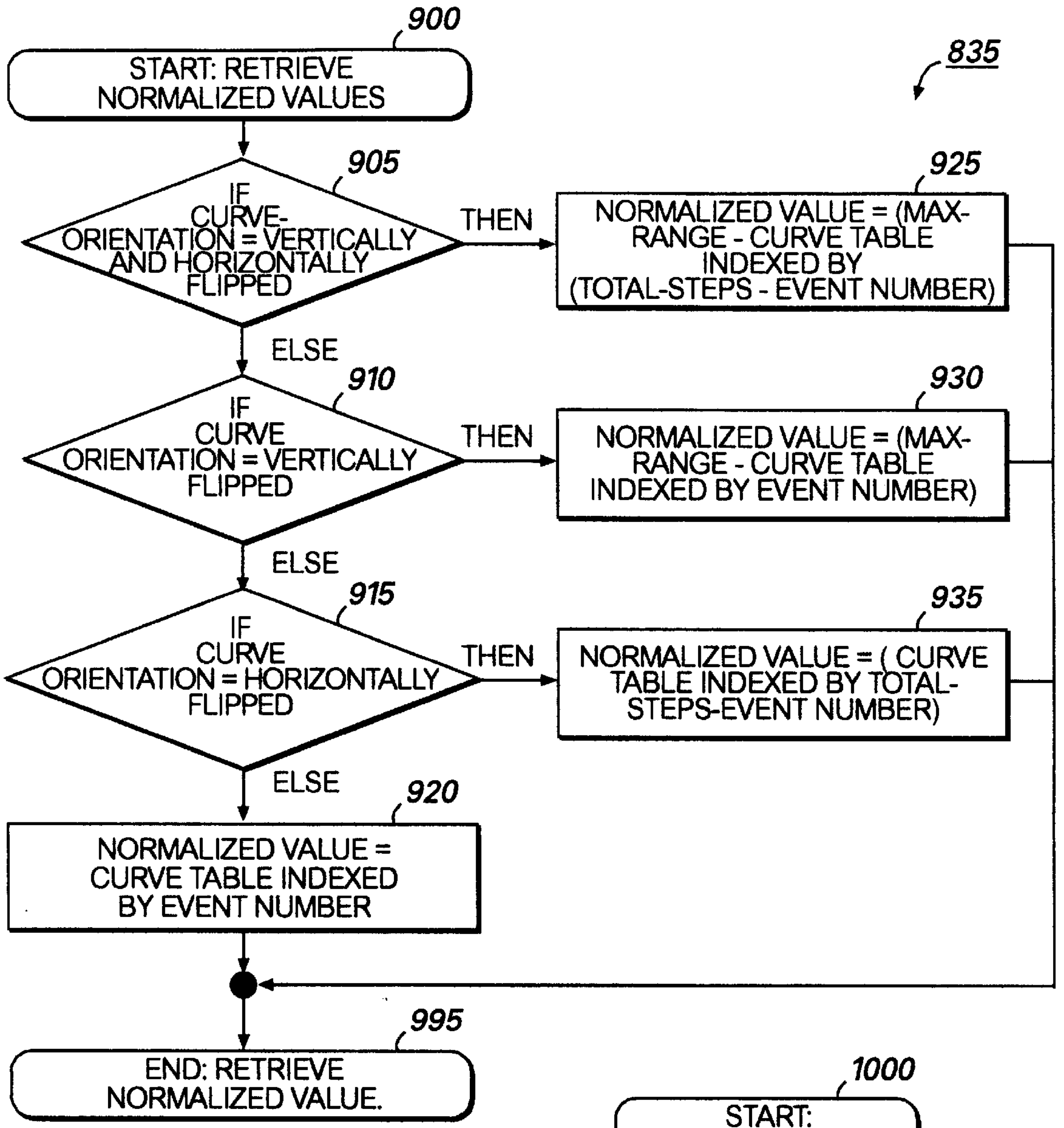
FIG. 9 is a flow diagram illustrating the details of an exemplary embodiment retrieving the normalized value for the next MIDI event.

At step 835, a normalized value for the next MIDI event is retrieved from the selected curve look-up table, indexed by the event-number. FIG. 9 is a flow diagram illustrating the details of an exemplary embodiment for retrieving the normalized value for the next MIDI event. The process starts at step 900. At step 905, the curve-orientation data field of the selected sub-curve data structure is examined. If the curve-orientation data field indicates that the curve-shape is vertically and horizontally flipped, then processing continues at step 925. If the curve-orientation data field does not indicate that the curve-shape is both horizontally flipped and vertically flipped, then processing continues at step 910.

At step 925, the normalized value for the next MIDI event is equated to the difference between the max-range and the value in the selected curve look-up table indexed by the difference between the total steps and the event-number. The value of the max-range depends on the structure of the curve look-up tables. In the exemplary embodiment, as described above, the max-range has been selected to be 100,000.

At step 910, if the curve-orientation data field indicates that the curve-shape is vertically flipped but not horizontally flipped, processing continues at step 930. If the curve-orientation data field does not indicate that the curve-shape is vertically flipped, then processing continues at step 915. At step 930, the normalized value for the next MIDI event is equated to the difference between the max-range and the value retrieved from the selected curve look-up table indexed by the event number.

At step 915, if the curve-orientation data field indicates that the curve-shape is horizontally flipped but not vertically flipped, processing continues at step 935. If the orientation data field does not indicated that the curve-shape is horizontally flipped, then processing continues at step 920. At step 935, the normalized value for the next MIDI event is retrieved from the selected curve look-up table indexed by the difference between the total steps and the event-number.

Step 920 is entered when the orientation data field indicates that the curve-shape is neither vertically nor horizontally flipped. In this case, the normalized value for the next MIDI event is retrieved from the value in the selected curve look-up table indexed by event number.

After determining the normalized value for the next MIDI event, the process is exited at step 995 and processing continues at step 840 of FIG. 8.

Figure 10:
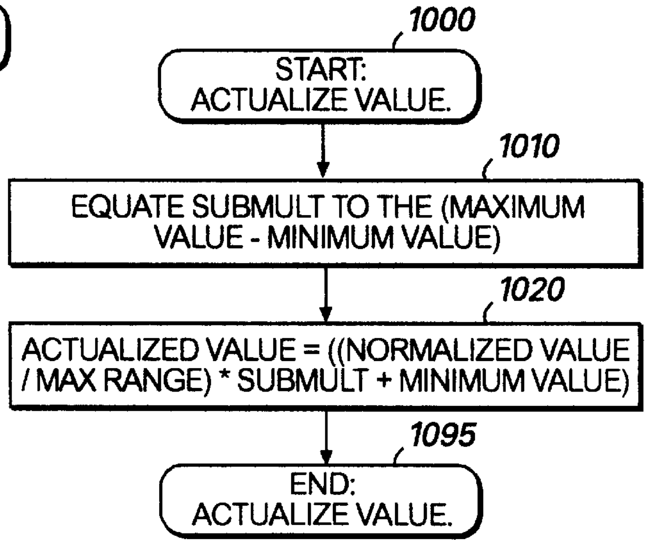
FIG. 10 is a flow diagram illustrating the details of an exemplary embodiment for actualizing the normalized value for the next MIDI event.

At step 840, a normalized value for the next MIDI event is adjusted in order to obtain the actual value for the next MIDI event (i.e., the actualized value). FIG. 10 is a flow diagram illustrating the details of an exemplary embodiment for actualizing the normalized value for the next MIDI event. In general, the normalized value is actualized against the range of values that can be represented by the MIDI event and the range of values represented by the curve event. The process starts at step 1000. At step 1010, a variable SubMult is equated to the difference between the maximum value and the minimum value identified in the sub-curve data structure and then divided by the max-range value (100,000 in the exemplary embodiment). Processing then continues at step 1020.

At step 1020, the normalized value is equated to the sum of the normalized value multiplied by the variable SubMult and the minimum value identified in the sub-curve data structure. After actualizing the normalized value, the process is exited at step 1095 and processing continues at step 845 of FIG. 8.

At step 845, the event-number variable is incremented by 1 and processing continues at step 850. At step 850, the event-number variable is examined to determine if the next MIDI event to be generated is the last MIDI event for the sub-curve. This may be determined by comparing the event-number variable to a constant (i.e., max-events) and branching to step 815 when the event-number is equal to or greater than max-events. If the event-number is less than the max-events, then processing returns to step 830 to begin the generation of the next MIDI event as described previously. In the exemplary embodiment, the max-events variable is equated to the total-steps −1, where total-steps is the number of steps represented in the look-up table.

At step 815, the last MIDI event in the series of MIDI events is generated. The time-stamp for the last MIDI event is set to the end-time for the curve-shape determined in step 515 of FIG. 5. The value of the last MIDI event is set to the end-value of the curve-shape as determined in step 520 of FIG. 5. After generating the last MIDI event, the process of generating MIDI events is ended at step 895.

MODIFYING CURVE EVENTS

The curve events can be displayed on a display screen of a MIDI sequencer along with discrete MIDI events and other musical data. The present invention provides a system and a method for editing the curve events when used with a MIDI sequencer or a similar editing technique. Rather than requiring a composer to modify a series of discrete MIDI events, the composer can simply modify various parameters of the curve events. The modified curve events then serve as the basis for generating the MIDI events.

As an example, a MIDI sequencer displays the wave form illustrated in FIG. 4 on a display device. A graphical user interface allows a user to move a pointing device over portions of the wave form. In addition, an interface is provided for a command source, such as a user or a computer application, to enter commands. The composer can select portions of the wave form to modify or distort. For instance, a composer may select the sine curve 430 and enter a command to replace it with an exponential curve. Also, a composer could select an end-point of a sub-curve, such as the end-point A corresponding with the end of linear curve 440 and the start of instantaneous curve 450. The composer can then move the end-point A to a new location such as end-point B. This action would result in modifying the minimum value of the sub-curve data structure 440 from V4 to V3 producing the curve 440', and the maximum value of the sub-curve data structure 450 from V4 to V3.

Although this aspect of the invention has been described as a graphical user interface, these modifications can also be made by directly editing the curve and sub-curve data structures. This aspect of the present invention is not limited to any specific interface or editing tools.

Additionally, a MIDI sequencer or other similar device can be used to directly create curve events. An exemplary embodiment of this aspect of the invention provides an interface for receiving parameters that represent the change in the magnitude of a musical signal over a given period of time. Thus, a user or some other source will provide information that defines the time-span of the musical signal, the values that the musical signal changes between, and a curve-shape identifying the contour of the musical signal. As an example, a start-time, end-time, maximum value, minimum value, and a curve-shape could be provided. In an alternative embodiment, the user or other source could provide multiple sets of these parameters. In an exemplary embodiment of this aspect of the invention, the input parameters are converted into a curve event data structure for storing and/or transmitting. Subsequently, the curve event data structure can be converted into a series of MIDI events that represent the change in the magnitude of the musical signal.

CONCLUSION

From the foregoing description, it will be appreciated that the present invention provides a system and a method for representing musical events in a manner which is efficient for storage and transmission and allows a composer to easily modify the musical event. Events such as pitch bend, volume change, mod wheel, and expression are represented by using a single MIDI event when editing, storing or transmitting the musical data. The single MIDI event can then be used to generate a series of discrete MIDI events when the musical data is being performed.

A series of discrete MIDI events are represented by a single curve event. The curve event is stored as a curve data structure and may include one or more sub-curve data structures. Each sub-curve data structure represents one or more of the series of discrete MIDI events. The curve data structure identifies when the curve event should start, the type of MIDI events that the curve represents, and a list of one or more sub-curve data structures. Each of the sub-curve data structures identify a curve-shape, the start time for the playback of the sub-curve, the end time for the playback of the sub-curve, the minimum and maximum values that the sub-curve reaches, and an orientation of the sub-curve.

At performance time, each sub-curve event in the curve data structure is converted into time-stamped, discrete MIDI events that can be provided as input to a MIDI device. This is accomplished by, for each sub-curve identified in a curve structure: (1) establishing the starting point of sub-curve; (2) establishing the value for the first MIDI event; (3) establishing the ending time of the sub-curve; (4) establishing the value for the last event; (5) generating a series of MIDI events between the first and last MIDI events The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

We claim:

1. A method of processing musical data, comprising the steps of:

receiving a plurality of original MIDI events; converting the plurality of original MIDI events into a single curve event; and generating a plurality of recreated MIDI events from the single curve event, the recreated MIDI events being approximate to but not identical to said original MIDI events.

2. The method of claim 1, further comprising the step of performing an operation with said single curve event, the operation including actions such as storing, editing and transmitting said single curve event.

3. The method of claim 1, wherein said single curve event includes a plurality of sub-curve events, and the step of converting the plurality of original MIDI events into a single curve event includes the steps of:

dividing said plurality of MIDI events into at least two subsets of MIDI events; and converting each subset of MIDI events into a sub-curve event.

4. The method of claim 3, wherein said step of performing an operation with said the single curve event includes the step of performing the operation on each of the sub-curve events.

5. The method of claim 1, wherein said single curve event includes a plurality of sub-curve events, each sub-curve event representing a subset of the original MIDI events, and said step of generating a plurality of recreated MIDI events from the single curve event includes the step of generating a subset of the recreated MIDI events for each sub-curve event, each subset of recreated MIDI events being approximate to but not identical to the subset of the original MIDI events.

6. A method of representing a change in the magnitude of a parameter of a musical signal over time, comprising the steps of:

receiving a time-span that identifies the time period over which the musical signal occurs relative to the start of a musical track;

receiving a magnitude-span that identifies the maximum and minimum values of the parameter of the musical signal within said time-span;

receiving a curve-shape that identifies the contour in the change of the parameter of said musical signal within said time-span while traversing between said maximum value and said minimum value; and creating a single curve event based on said time-span, magnitude-span, and curve-shape.

7. The method of claim 6, further comprising the step of performing an operation with the single curve event, the operation including storing, editing and transmitting said single curve event.

8. The method of claim 6, further comprising the step of generating a plurality of MIDI events from said single curve event, said plurality of MIDI events being approximate to but not necessarily identical to the change in the magnitude of the parameter of said musical signal.

9. A system for editing musical data, comprising:

a processing unit;

a memory storage device;

a data interface for receiving and transmitting musical data;

a program module, stored in said memory storage device for providing instructions to said processing unit;

said processing unit, responsive to the instruction of said program module, being operative to:

receive a plurality of original MIDI events from a source, the source being one of at least two possible sources including said memory storage device and said data interface; and convert the plurality of original MIDI events into a single curve event.

10. The system of claim 9, wherein the system further comprises a display device and a command source, and said processing unit is further operative to:

display said single curve event on the display device; and in response to receiving a command from said command source, modify aspects of said single curve event.

11. The system of claim 10, wherein said processing unit is operative to modify aspects of said single curve event by changing the time-span of the single curve event.

12. The system of claim 10, wherein said processing unit is operative to modify aspects of said single curve event by changing the magnitude-span of the single curve event.

13. The system of claim 10, wherein said single curve event includes at least one sub-curve event, and said processing unit is further operative to modify said single curve event by accepting commands from the user to modify aspects of at least one sub-curve event.

14. The system of claim 13, wherein said processing unit is operative to modify aspects of said sub-curve event by changing said shape of the sub-curve event.

15. The system of claim 10, wherein said processing unit is operative to generate a plurality of new MIDI events from said single curve event, the new MIDI events being based on said modified single curve event.

16. A computer-readable medium having a plurality of data fields stored on the medium and representing a musical event in the form of a data structure, said musical event including a change in the magnitude of a parameter of a signal over a period of time and being associated with a musical track, said data structure comprising:

a first data field containing data that defines a time-offset corresponding to the start of said musical event relative to the start of said musical track;

a second data field containing data that identifies said parameter of said signal that changes during said musical event; and a third data field containing data that represents the changes in the parameter of the signal over said period of time by describing a contour.

17. The computer-readable medium of claim 16, wherein said contour described in said third data field is an ordered list of curve-shapes, each curve-shape corresponding with a time-slice of said period of time and being defined by a look-up table of normalized values indexed by time, and is represented by a data structure comprising:

a fourth data field containing data that identifies a start-time, relative to said time-offset, corresponding with the start of said time-slice associated with a particular curve-shape;

a fifth data field containing data that identifies an end-time, relative to the time-offset, corresponding with the end of said time-slice associated with the particular curve-shape;

a sixth data field containing data that identifies a maximum value represented by said curve-shape;

a seventh data field containing data that identifies a minimum value represented by said curve-shape; and an eighth data field containing data that identifies an orientation of said curve-shape.

18. The computer-readable medium of claim 16, wherein said contour described in said third data field is an ordered list of curve-shapes, each curve-shape corresponding with a time-slice of said period of time and being defined by an equation that can be used to generate a normalized value for a given time, and is represented by a data structure comprising:

a fourth data field containing data that identifies a start-time, relative to the time-offset, corresponding with the start of said time-slice associated with a particular curve-shape;

a fifth data field containing data that identifies an end-time, relative to the time-offset, corresponding with the end of said time-slice associated with the particular curve-shape;

a sixth data field containing data that identifies a maximum value represented by said curve-shape;

a seventh data field containing data that identifies a minimum value represented by said curve-shape; and an eighth data field containing data that identifies an orientation of said curve-shape.

19. A method for representing a series of MIDI events as a single curve event data structure, the series of MIDI events defining a change in the magnitude of a parameter of a signal over a period of time and being associated with a track, each of the MIDI events having a time-stamp relative to the beginning of the track, comprising the steps of:

equating a time-offset data field of the curve event data structure to the time-stamp of the first MIDI event in the series of MIDI events;

equating an event-type data field to the type of MIDI event in the series of MIDI events;

dividing the series of MIDI events into one or more sub-series of MIDI events, each sub-series of MIDI events containing the maximum number of consecutive MIDI events for which the contour of the change of the parameter of the signal over the time represented by the MIDI events can be represented by a predefined curve selected from a plurality of predefined curves; and for each sub-series, creating a data structure by:

defining a curve-shape data field containing data identifying a predefined curve, selected from the plurality of predefined curves, to represent the sub-series, and defining a start-time data field containing data that identifies the start of the sub-series of MIDI events relative to the start of the track.

20. The method of claim 19, wherein the step of creating a data structure, further includes:

defining an end-time data field containing data that identifies the end of the sub-series of MIDI events;

defining a maximum value data field containing data that identifies the maximum value for the magnitude of the parameter of the signal represented in the sub-series of MIDI events; and defining a minimum value data field containing data that identifies the minimum value for the magnitude of the parameter of the signal represented by the sub-series of MIDI events.

21. The method of claim 19, wherein the step of defining a curve-shape data field further comprises the step of defining an orientation for the predefined curve, the orientation being selected from a group of orientations including a vertically flipped orientation, a horizontally flipped orientation, a vertically and horizontally flipped orientation, and a non-flipped orientation.

22. The method of claim 19, wherein the step of defining a curve-shape data field further comprises the step of identifying an orientation for the predefined curve, the orientation having a mirrored status and a rotation degree, the mirrored status being set to one of two states including mirrored and non-mirrored and the rotation degree indicating a degree of radial rotation.

23. A method for generating a series of MIDI events from a curve event associated with a musical track, the curve event defining a change in the magnitude of a parameter of a signal over a period of time and including a time-offset defining a start time relative to the start of the musical track, an event-type, and an ordered list of curve-shapes, each of the curve-shapes in the ordered list defining a minimum time, a maximum time, a minimum value and a maximum value, comprising the steps of:

selecting a curve-shape from the ordered list of curve-shapes;

determining a start-time for the selected curve-shape based on the time-offset of the curve event and the minimum time of the selected curve-shape;

determining an end-time for the selected curve-shape based on the time-offset of the curve event and the maximum and minimum time of the selected curve-shape;

defining a first MIDI event for the selected curve-shape based on the start-time of the selected curve-shape, the event-type, and the maximum and minimum values;

defining a last MIDI event for the selected curve-shape based on the end-time of the selected curve-shape, the event-type, and the maximum and minimum values; and defining a plurality of interim MIDI events by:

assigning time-stamps to each of the plurality of interim MIDI events, each of the time-stamps being distributed in a substantially uniform manner at points of time between the first MIDI event and the last MIDI event of the selected curve-shape, and assigning values that proportionately track the contour of the curve-shape actualized to the maximum and minimum values of the selected curve-shape.

24. The method of claim 23, wherein each curve-shape of the ordered list of curve-shapes is defined as a function that increases with time, the selected curve-shape being a continuous type curve-shape and having an orientation, the orientation of the selected curve-shape functionally identifying one of a plurality of states including a non-flipped state, a horizontally flipped state, a vertical flipped state, and a horizontally and vertically flipped state, and the step of defining a first MIDI event for the selected curve-shape comprises the steps of:

examining the orientation of the selected curve-shape;

if the orientation functionally identifies a non-flipped state, setting the value of the first MIDI event to the minimum value;

if the orientation functionally identifies a horizontally flipped state, setting the value of the first MIDI event to the maximum value;

if the orientation functionally identifies a vertically flipped state, setting the value of the first MIDI event to the maximum value; and if the orientation functionally identifies a horizontally and vertically flipped state, setting the value of the first MIDI event to the minimum value.

25. The method of claim 23, wherein each curve-shape of the ordered list of curve-shapes is defined as a function that increases with time, the selected curve-shape being an instantaneous type curve-shape and having an orientation, the orientation of the selected curve-shape functionally identifying one of a plurality of states including a non-flipped state, a horizontally flipped state, a vertically flipped state, and a horizontally and vertically flipped state, and the step of defining a first MIDI event for the selected curve-shape comprises the steps of:

examining the orientation of the selected curve-shape;

if the orientation functionally identifies a non-flipped state, setting the value of the first MIDI event to the maximum value;

if the orientation functionally identifies a horizontally flipped state, setting the value of the first MIDI event to the minimum value;

if the orientation functionally identifies a vertically flipped state, setting the value of the first MIDI event to the minimum value; and if the orientation functionally identifies a horizontally and vertically flipped state, setting the value of the first MIDI event to the minimum value.

26. The method of claim 23, wherein each curve-shape of the plurality of curve-shapes is defined as a function that increases with time, the selected curve-shape being a continuous type curve-shape and having an orientation, the orientation of the selected curve-shape functionally identifying one of a plurality of states including a non-flipped state, a horizontally flipped state, a vertically flipped state, and a horizontally and vertically flipped state, and the step of defining a last MIDI event for the selected curve-shape comprises the steps of:

examining the orientation of the selected curve-shape;

if the orientation functionally identifies a non-flipped state, setting the value of the last MIDI event to the maximum value;

if the orientation functionally identifies a horizontally flipped state, setting the value of the last MIDI event to the minimum value;

if the orientation functionally identifies a vertically flipped state, setting the value of the last MIDI event to the minimum value; and if the orientation functionally identifies a horizontally and vertically flipped state, setting the value of the last MIDI event to the maximum value.

27. The method of claim 23, wherein each curve-shape of the plurality of curve-shapes is defined as a function that increases with time, the selected curve-shape being an instantaneous type curve-shape and having an orientation, the orientation of the selected curve-shape functionally identifying one of a plurality of states including a non-flipped state, horizontally flipped state, vertically flipped state, and horizontally and vertically flipped state, and the step of defining a last MIDI event for the selected curve-shape comprises the steps of:

examining the orientation of the selected curve-shape;

if the orientation functionally identifies a non-flipped state, setting the value of the last MIDI event to the maximum value;

if the orientation functionally identifies a horizontally flipped state, setting the value of the last MIDI event to the minimum value;

if the orientation functionally identifies a vertically flipped state, setting the value of the last MIDI event to the minimum value; and if the orientation functionally identifies a horizontally and vertically flipped state, setting the value of the last MIDI event to the maximum value.

28. The method of claim 23 wherein the step of assigning time-stamps to the plurality of interim MIDI events, comprises the steps of:

equating a time-step offset to the time-span between the start-time and the end-time of the selected curve-shape divided by N steps, where N is a positive integer representing the maximum number of MIDI events in the series of MIDI events; and equating the time-stamp of each of the plurality of MIDI events to the sum of the time-stamp of the previous MIDI event and the time-step offset.

29. The method of claim 23, wherein the step of assigning values to the plurality of interim MIDI events, comprises the steps of:

determining a normalized value for a particular MIDI event based on the selected curve-shape and the time-stamp of the MIDI event; and actualizing the normalized value based on the maximum value and minimum value of the selected curve-shape.

30. The method of claim 29, wherein the step of determining a normalized value comprises the step of obtaining the normalized value from a table indexed as a function of the time-stamp of the MIDI event.

31. The method of claim 29, wherein the step of determining a normalized value comprises the step of calculating the normalized value from a curve-shape equation as a function of the time-stamp of the MIDI event.

32. The method of claim 23, wherein the step of assigning time-stamps to the plurality of interim MIDI events, comprises the steps of:

equating a time-step offset to the time-span between the start-time and the end-time of the selected curve-shape divided by N steps, where N is a positive integer representing the maximum number of MIDI events in the series of MIDI events;

if the time-step offset is greater than a minimum-time-step offset, equating the time stamp of each of the plurality of MIDI events to the sum of the time stamp of the previous MIDI event and the time-step offset; and if the time-step is not greater than the minimum-time-step size, equating the time stamp of each of the plurality of MIDI events to the sum of the time stamp of the previous MIDI event and the minimum-time-step size.

33. The method of claim 30, wherein the value of N is about 200.

* * * * *